United States Patent [19]

Schlossberg

[11] 4,220,399
[45] Sep. 2, 1980

[54] NEAR MILLIMETER WAVELENGTH ELECTROMAGNETIC FILTER

[76] Inventor: Howard R. Schlossberg, 4811 Hercules Ct., Annandale, Va. 22003

[21] Appl. No.: 960,194

[22] Filed: Nov. 13, 1978

[51] Int. Cl.² .............................................. G02B 5/28
[52] U.S. Cl. ...................................... 350/163; 350/1.1
[58] Field of Search ............... 350/163, 164, 166, 1.1, 350/1.6, 1.7; 356/346, 352

[56] References Cited

U.S. PATENT DOCUMENTS

| 3,499,699 | 3/1970 | Ayres et al. | 350/163 |
| 3,575,490 | 4/1971 | Reisman | 350/163 |
| 3,614,655 | 10/1971 | Bolger | 350/163 |
| 3,799,654 | 3/1974 | Donne | 350/166 |

Primary Examiner—Jon W. Henry
Attorney, Agent, or Firm—Joseph E. Rusz; Jacob N. Erlich

[57] ABSTRACT

A near millimeter wavelength electromagnetic filter having a pair of substantially parallel mirrors and a beamsplitter interposed therebetween. The mirrors are spaced apart a distance equal to an integer times half the preselected (near millimeter) wavelength thereby producing a resonant condition. At this resonant condition substantially all the preselected wavelength radiation is reflected by the beamsplitter while other wavelengths pass therethrough thereby removing the preselected wavelength radiation from a beam of radiant energy.

10 Claims, 2 Drawing Figures

NEAR MILLIMETER WAVELENGTH ELECTROMAGNETIC FILTER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optical or electromagnetic filters, and, more particularly to a broad or narrow band, tunable or fixed frequency electromagnetic filter which is usable over a wide region of wavelengths with specific applicability in the near millimeter and submillimeter wavelength region.

An ever expanding wavelength region of interest is the short wavelength region (infrared, submillimeter and millimeter wavelength region) such as produced by the $CO_2$ laser used on reconnaissance, communications, radar, imaging systems and polution detection devices.

Heretofore, metal meshes and other related structures have been utilized as filters in the near millimeter wavelength region. Unfortunately, in the construction of these filters for use at short wavelengths, some basic difficulties are encountered. Both the resistive losses in the metal paths of the grids and the dielectric losses in the films supporting some type of grids increase with frequency and begin to affect seriously the performance of the filter. The other difficulty is that of constructional tolerances. Their influence increases proportional to the frequency. Another difficulty in the construction of a filter of the type set forth hereinabove is the limited number of different grids that are commercially available, and the insufficient knowledge of their optical properties, especially of their reflection phase. In addition, these filters are generally nontunable. Consequently, it is clearly obvious that the filters of the past for use in the near millimeter wavelength region were of complex construction and generally ineffective in their usage.

SUMMARY OF THE INVENTION

The near millimeter wavelength electromagnetic filter of this invention overcomes the problems set forth in detail hereinabove by providing a low loss spectral filter for the near millimeter and submillimeter wavelength region which can be made broad or narrow band, tunable or fixed frequency and capable of use over a wide region of wavelengths.

The electromagnetic filter of this invention is made up of a housing having adjustably mounted therein a pair of mirrors. The pair of mirrors are situated substantially parallel to each other and are made as highly reflecting as possible over the wavewavelength region of interest (for example, near millimeter wavelength). Interposed between the mirrors is a beamsplitter which is made highly transmissive in the wavelength region of interest. The absorption and scattering of the beamsplitter are kept much less than the transmission. The above conditions, as opposed to prior art requirements, can be easily met by applying suitable coatings and/or adjusting the beamsplitter thickness, if necessary.

In operation, the incident radiation impinges upon the beam splitter. If the spacing between the mirrors is equal to an integer number times half the wavelength of interest (preselected) of the incident radiation, a resonant condition is achieved. If the wavelength is right for the resonant condition, a standing wave field builds up between the mirrors in the proper way so as to destructively interfere with and cancel the preselected wavelength of radiation passing through the beamsplitter. As a result, almost the entire preselected radiation of interest is reflected from the beamsplitter back in the direction from which it came. Thus, the electromagnetic filter of this invention can be utilized to remove any unwanted narrow band of frequency (in transmission) or to pick out a narrow band of frequency (in reflection).

It is therefore an object of this invention to provide a low loss electromagnetic filter capable of use over a wide region of wavelengths and in particular in the near millimeter and submillimeter wavelengths.

It is another object of this invention to provide an electromagnetic filter which can be broad or narrow band.

It is still another object of this invention to provide an electromagnetic filter which can be easily tunable.

It is a further object of this invention to provide an electromagnetic filter which is economical to produce and which utilizes conventional, currently available components, that lend themselves to standard mass producing manufacturing techniques.

For a better understanding of the present invention, together with other and further objects thereof, reference is made to the following description taken in conjunction with the accompanying drawing scope will be pointed out in the appended claims.

DETAILED DESCRIPTION OF THE DRAWING

Figure 1:
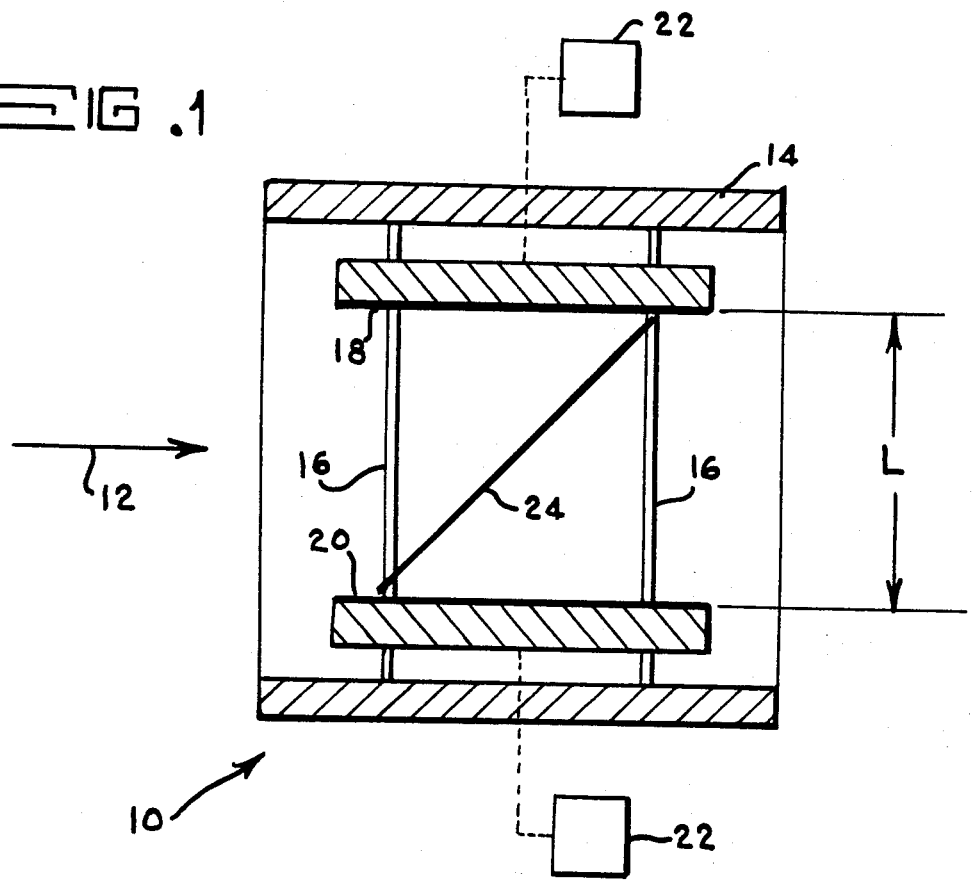
Figure 2:
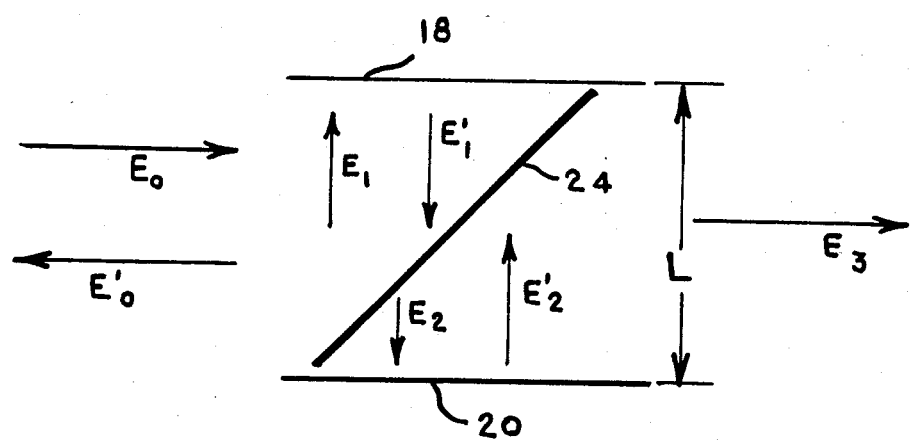

FIG. 1 is a schematic representation of the electromagnetic filter of this invention shown partly in cross section; and FIG. 2 is a schematic representation of the electromagnetic filter of this invention, setting forth the relevant electric fields.

DETAILED DESCRIPTION OF THE PREFERRED EMBODIMENT

Reference is now made to FIG. 1 of the drawing which clearly shows the near millimeter wavelength electromagnetic filter 10 of this invention. Electromagnetic filter 10 is in optical alignment with an input signal 12 which may emanate from, for example, a laser (not shown). Making up electromagnetic filter 10 is any suitable housing 14 of hollow configuration. Housing 14 contains therein conventional mounting means in the form of, for example, slots 16 or struts to which are are operably attached to a pair of reflective surfaces in the form of mirrors 18 and 20, respectively. Mirrors 18 and 20 are substantially parallel to each other and can either fixed for a predetermined length L therebetween or adjusted by having any conventional moving means such as electric motors 22 attached thereto for adjustment thereof, in a manner to be described in detail hereinbelow.

Each mirror surface 18 and 20 is made as highly reflecting as possible of the wavelength region of interest (for example for near millimeter wavelength the mirrors might be coated with evaporated silver and a very thin protective overcoating as is conventional in the art). In addition, it is unnecessary with the electromagnetic filter 10 of this invention for mirrors 18 and 20 to have any transmission, thereby substantially improving their overall effectiveness.

Interposed between mirrors 18 and 20 is a directing means preferably in the form of a conventional beamsplitter 24. Beamsplitter 24 receives the incoming signal 12 in a manner to be described in detail hereinbelow. Beam splitter 24 is generally made of a thin, low absorption dielectric material such as mylar and being highly transmissive (approximately 90%) in the wavelength region of interest. In addition, the absorption and scattering loss of beamsplitter 24 are substantially less than the reflection. These conditions can be met by applying any suitable coating and/or adjusting the beamsplitter if necessary.

It should be further realized that although the above description of electromagnetic filter 10 was made with reference to a pair of mirrors 16 and 18 and one beamsplitter 24, additional mirrors and beamsplitters can be incorporated within filter 10 if a particular need arises wherein such an arrangement is desirable.

For proper operation of the electromagnetic filter 10 of this invention the spacing L between mirrors 18 and 20 must be equal to an integer number times half the wavelength of the radiation of interest in input signal 12, this being called the resonant condition. If this criteria is not met the condition would then be referred to as non-resonant. In the non-resonant condition substantially all the radiation of interest (approximately 90%) simply passes through beamsplitter 24. However, if filter 10 of this invention is arranged for a resonant condition, a standing wave field builds up between mirrors 18 and 20 in exactly the right manner so as to destructively interfere with and cancel the radiation of interest passing through beamsplitter 24. Consequently, substantially the entire preselected radiation is reflected from beam splitter 24 back in the direction from which it came. In this manner optical filter 10 removes the unwanted narrow band of frequencies of interest (in transmission) or picks out a narrow band of frequencies (in reflection).

The above described behavior can be clearly demonstrated with reference to the field quantities as best shown schematically in FIG. 2 of the drawing.

For simplicity, the reflectivity of mirrors 18 and 20 are taken as 100% and absorption and scattering in beamsplitter 24 are ignored. The amplitude transmission and reflection coefficients of beamsplitter 24 are denoted by t and r respectively. Then, from FIG. 2 for radiation of wavelength $\lambda$;

$$E_1 = rE_o + tE_2' \quad (1)$$

$$E_2 = tE_1' \quad (2)$$

$$E_o' = rE_1' \quad (3)$$

$$E_3 = tE_o + rE_2' \quad (4)$$

$$E_1' = E_1 e^{-2ikL_1} \quad (5)$$

$$E_2' = E_2 e^{-2ikL_2} \quad (6)$$

where $L_1$ and $L_2$ are the distances from the beamsplitter 24 to mirrors 18 and 20, respectively, and $k = 2\pi/\lambda$. Then $$E_1 = rE_o + t^2 e^{-2ikL} E_1$$

with $$L = L_1 + L_2$$

or $$E_1 = \frac{rE_o}{1 - t^2 e^{-2ikL}} \quad (1')$$

$$E_3 = tE_o + \frac{r^2 t e^{-2ikL} E_O}{1 - t^2 e^{-2ikL}}$$

$$E_3 = \frac{tE_o\{1 + (R^2 - t^2)e^{-2ikL}\}}{1 - t^2 e^{-2ikL}} \quad (4')$$

$$E_o' = \frac{r^2 e^{-2ikL_1}}{1 - t^2 e^{-2ikl}} \quad (3')$$

For resonance $$e^{-2ikL} = 1 \text{ since } L = n\lambda/2$$

so $$E_3 = tE_o\{1 - (t^2 - r^2)\}/1 - t^2 \quad (4'')$$

$$E_o' = r^2 E_o / 1 - t^2 \quad (3'')$$

Now $$|r|^2 + |t|^2 = 1 \quad (7)$$

and (from Maxwells Equations)

$$t - r = 1 \quad (8)$$

For high transmission and low reflection (7) and (8) give a good approximation $$t^2 = |t|^2,$$

$$r^2 = -|r|^2$$

whence from (4'') and (3'')

$$E_3 = 0 \quad (4''')$$

$$E_o' = -E_o \quad (3''')$$

showing that no energy is transmitted and all of the energy is reflected, as stated above.

Although this invention has been described with reference to a particular embodiment, it will be understood to those skilled in the art that this invention is also capable of further and other embodiments within the spirit and scope of the appended claims.

I claim:

1. An electromagnetic filter assembly which is operable in conjunction with a beam of radiant energy having a wide band of wavelengths comprising at least two highly reflective surfaces, each of said highly reflective surfaces being in optical alignment with each other, said reflective surfaces being spaced apart a distance equal to an integer number times half a preselected wavelength of said wavelengths of said beam of radiant energy thereby achieving a resonant condition and means in optical alignment with said beam of radiant energy and said reflective surfaces for directing in a predetermined direction substantially all of said preselected wavelengths of said beam of radiant energy when said resonant condition is achieved thereby removing substantially all of said preselected wavelength from said beam of radiant energy.

2. An electromagnetic filter assembly as defined in claim 1 comprising two of said highly reflective surfaces, said highly reflective surfaces being substantially parallel to each other.

3. An electromaagnetic filter assembly as defined in claim 2 wherein said directing means is interposed between said reflective surfaces, said directing means also reflecting said beam of radiant energy in a direction substantially perpendicular to said reflective surfaces.

4. An electromagnetic filter assembly as defined in claim 3 wherein said directing means is highly transmissive in said preselected wavelength of said beam of radiant energy.

5. An electromagnetic filter assembly as defined in claim 4 wherein said reflective surfaces are substantially totally reflective at said preselected wavelength of said beam of radiant energy.

6. An electromagnetic filter assembly as defined in claim 5 further comprising means for adjustably mounting said reflective surfaces and means operably attached to said reflective surfaces for moving said reflective surfaces with respect to each other.

7. An electromagnetic filter assembly which is operable in conjunction with a beam of radiant energy comprising at least two highly reflective surfaces, each of said highly reflective surfaces being in optical alignment with each other, said reflective surfaces being spaced apart a distance equal to an integer number times half a preselected wavelength of said beam of radiant energy thereby achieving a resonant condition and means in optical alignment with said beam of radiant energy and said reflective surfaces for directing in a predetermined direction substantially all of said preselected wavelength of said beam of radiation when said resonant condition is achieved.

8. An electromagnetic filter assembly as defined in claim 7 comprising two of said highly reflective surfaces, said highly reflective surfaces being substantially parallel to each other.

9. An electromagnetic filter assembly as defined in claim 8 wherein said directing means is highly transmissive in said preselected wavelength of said beam of radiant energy.

10. An electromagnetic filter assembly as defined in claim 9 wherein said directing means is in the form of a beamsplitter.

* * * * *

UNITED STATES PATENT AND TRADEMARK OFFICE
CERTIFICATE OF CORRECTION

PATENT NO. : 4,220,399
DATED : 2 September 1980
INVENTOR(S) : Howard R. Schlossberg It is certified that error appears in the above-identified patent and that said Letters Patent are hereby corrected as shown below:

Column 4, line 9,

"$E_3 = \frac{tE_o\{1+(R^2-t^2)e^{-2ikL}\}}{1-t^2e^{-2ikL}}$"   should read

--- $E_3 = \frac{tE_o\{1+(r^2-t^2)e^{-2ikL}\}}{1-t^2e^{-2ikL}}$ ---

Column 4, line 19,

"$E_3 = tE_o\{1-(t^2-r^2)\}/1-t^2$"   should read

--- $E_3 = \frac{tE_o\{1-(t^2-r^2)\}}{1-t^2}$ ---

Column 4, line 21,

"$E_o' = r^2E_o/1-t^2$"   should read

--- $E_o' = \frac{r^2E_o}{1-t^2}$ ---

Signed and Sealed this

*Twenty-seventh* Day of *January 1981*

[SEAL]

*Attest:*

RENE D. TEGTMEYER

*Attesting Officer*   *Acting Commissioner of Patents and Trademarks*